United States Patent
Johncock et al.

(10) Patent No.: US 9,402,505 B2
(45) Date of Patent: Aug. 2, 2016

(54) SYSTEM AND METHOD FOR OPERATING ROTISSERIE OVEN

(75) Inventors: James C. Johncock, Shelbyville, MI (US); Foad M. Kesheh, Joinville (BR); Steven M. Swayne, Chattanooga, TN (US)

(73) Assignee: Whirlpool Corporation, Benton Harbor, MI (US)

( * ) Notice: Subject to any disclaimer, the term of this patent is extended or adjusted under 35 U.S.C. 154(b) by 997 days.

(21) Appl. No.: 12/638,448

(22) Filed: Dec. 15, 2009

(65) Prior Publication Data

US 2011/0142998 A1 Jun. 16, 2011

(51) Int. Cl.
A47J 37/04 (2006.01)
F24C 15/16 (2006.01)
A47J 27/62 (2006.01)
A23L 1/01 (2006.01)

(52) U.S. Cl.
CPC ............ *A47J 37/041* (2013.01); *F24C 15/164* (2013.01); *A23L 1/01* (2013.01); *A47J 27/62* (2013.01); *A47J 37/04* (2013.01)

(58) Field of Classification Search
CPC ......... A47J 37/041; A47J 27/62; A47J 37/04; F24C 15/164; A23L 1/01
USPC ............. 99/419, 420, 421 R, 421 H, 421 HH, 99/421 HV, 421 M, 421 P, 421 TP, 421 V, 99/325, 331, 323.7; 426/233, 520
See application file for complete search history.

(56) References Cited

U.S. PATENT DOCUMENTS

| | | | |
|---|---|---|---|
| 2,330,132 A | 9/1943 | Martin et al. | |
| 3,321,982 A * | 5/1967 | Maunus et al. | 74/84 R |
| 3,633,491 A | 1/1972 | Williams, Jr. et al. | |
| 4,114,523 A | 9/1978 | Eff | |
| 4,214,516 A * | 7/1980 | Friedl et al. | 99/421 P |
| 4,535,750 A | 8/1985 | Hebert et al. | |
| 5,361,686 A | 11/1994 | Koopman | |
| 5,451,744 A | 9/1995 | Koopman et al. | |
| 5,639,497 A * | 6/1997 | Bedford et al. | 426/233 |
| 6,170,390 B1 | 1/2001 | Backus et al. | |
| 6,393,972 B1 | 5/2002 | Backus et al. | |
| 7,424,849 B2 | 9/2008 | Backus et al. | |
| 7,487,716 B2 | 2/2009 | Swank et al. | |
| 2002/0144607 A1 | 10/2002 | Backus et al. | |
| 2004/0144260 A1* | 7/2004 | Backus et al. | 99/419 |
| 2004/0182254 A1 | 9/2004 | Gershon | |
| 2006/0144248 A1 | 7/2006 | Backus et al. | |
| 2006/0196367 A1 | 9/2006 | Osterman | |
| 2008/0047440 A1 | 2/2008 | Carlson | |
| 2008/0098903 A1 | 5/2008 | Hecker et al. | |
| 2008/0250940 A1 | 10/2008 | Backus et al. | |

* cited by examiner

*Primary Examiner* — Erik Kashnikow
*Assistant Examiner* — Preston Smith

(57) ABSTRACT

An oven for performing a rotisserie cooking operation includes an oven cavity having a door for selectively accessing the oven cavity, at least one heating element for heating the oven cavity and a rotisserie arm adapted to support a food product within the oven cavity. A motor is operatively coupled to the rotisserie arm for rotating the rotisserie arm and a food product. The oven also includes a control interface having a rotisserie cooking mode input and a control system for controlling the rotisserie motor and the heating element. In addition to other functions, the control system automatically causes the rotisserie motor to cycle on and off to allow for intermittent rotation of the food product supported on the rotisserie arm when the oven door is opened.

9 Claims, 2 Drawing Sheets

SYSTEM AND METHOD FOR OPERATING ROTISSERIE OVEN

BACKGROUND OF THE INVENTION

1. Field of the Invention

The present invention pertains to the art of cooking and, more particularly, a system and method of operating a rotisserie oven.

2. Description of the Related Art

In general, placing a rotisserie assembly in a domestic oven is known in the art of cooking appliances. In typical arrangements, a rotisserie arm is positioned in an oven cavity for supporting food to be cooked. The rotisserie arm is typically driven by a motor which causes the rotisserie arm and food to rotate at a constant speed. In this known arrangement, the motor is switched off when the oven door is opened to stop the rotation of the rotisserie arm in order to baste or brown the food supported on the rotisserie arm. For example, U.S. Pat. No. 5,639,497, which discloses a cooking control system for rotisserie ovens, includes an assembly for driving a food supporting spit. When the oven door is opened, the rotisserie driving assembly is disabled. Similarly, each of U.S. Pat. Nos. 5,361,686 and 5,451,744 discloses a rotisserie oven wherein, when the oven door is opened, the motor is disabled. Conversely, when the door is again closed in each of these ovens, power is restored to the motor and the motor resumes operation.

When performing a rotisserie cooking operation, periodic basting of the food product being rotated may be desirable. Using these known constructions, only a single side of the food product would be exposed upon opening of the door such that, if a user wanted to baste all sides of the food product, the oven door would need to be repeatedly opened and closed in order to rotate the food for basting. Obviously, this is burdensome to the user and would require accuracy to open the door at precisely the correct time when the desired part of the food product to be basted is exposed. Based on the above, there exists a need in the art for a cooking appliance having a rotisserie motor which can be operated even when the oven door is open.

SUMMARY OF THE INVENTION

The present invention is directed to an oven for performing a rotisserie cooking operation and a method of performing a rotisserie operation. In accordance with a preferred embodiment of the invention, the oven includes an oven cavity having a door movable between open and closed positions in order to selectively provide access to the oven cavity, at least one heating element exposed to heat the oven cavity and a rotisserie arm adapted to support a food product positioned within the oven cavity. A motor is operatively coupled to the rotisserie arm for driving the rotisserie arm and rotating the food product on the arm. The oven also includes a control interface having a rotisserie cooking mode input and a control system for controlling the rotisserie motor and the heating element. Most importantly, the control system enables the motor to further rotate the rotisserie arm even when the door is in the open position. In the most preferred form of the invention, the control system causes the rotisserie motor to cycle on and off to allow for an intermittent 360 degree rotation of the food product supported on the rotisserie arm while the oven door is in the open position.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
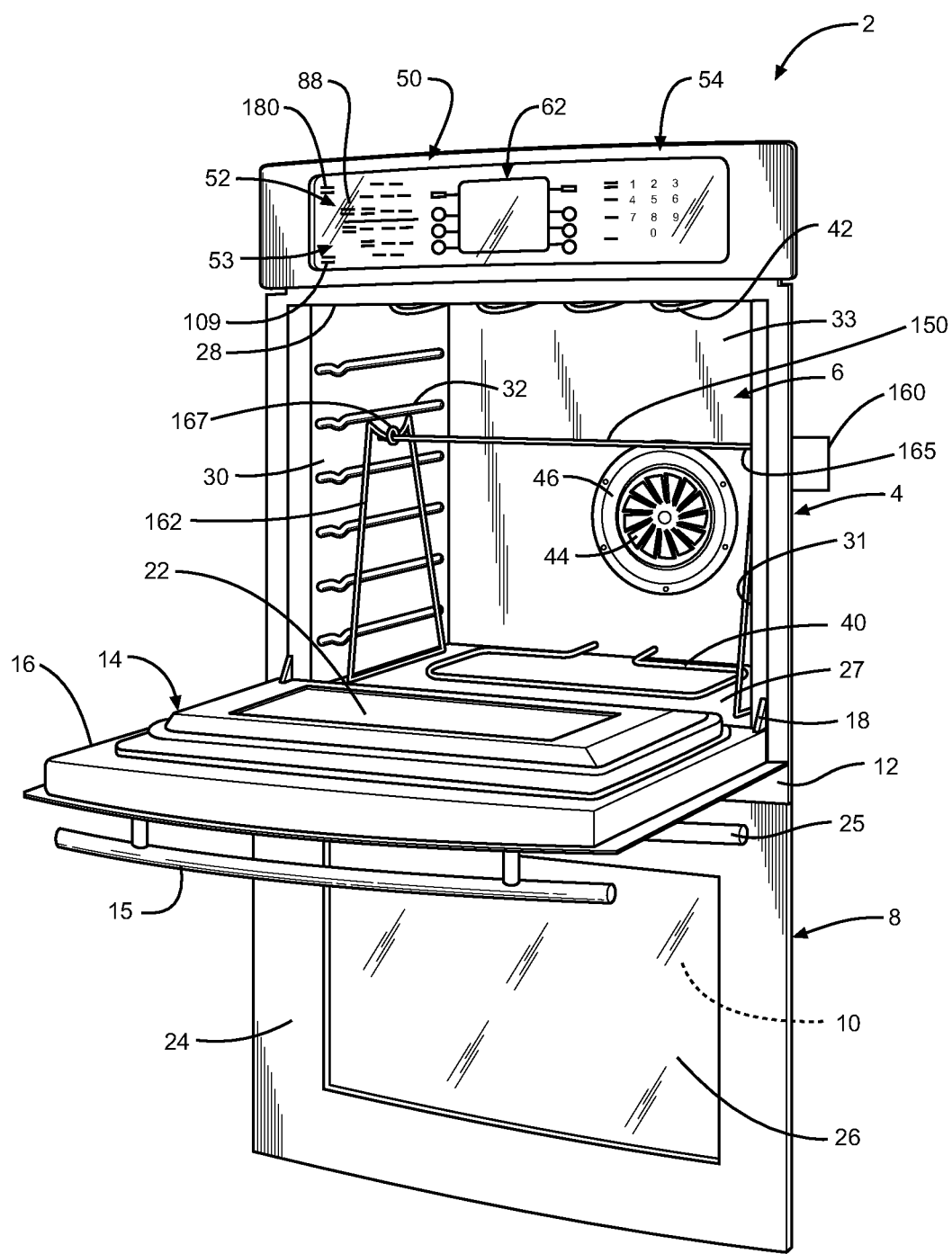
FIG. 1 is a perspective view of a double wall oven incorporating a rotisserie arrangement in accordance with the present invention.

With initial reference to FIG. 1, a cooking appliance constructed in accordance with the present invention is generally indicated at 2. Cooking appliance 2, as depicted, constitutes a double wall oven. However, it should be understood that the present invention not limited to this model type and can be incorporated into various types of oven configurations, e.g., cabinet mounted ovens, as well as both slide-in and free standing ranges. In any event, in the embodiment shown, cooking appliance 2 constitutes a dual oven wall unit including an upper oven 4 having upper oven cavity 6 and a lower oven 8 having a lower oven cavity 10. Cooking appliance 2 includes an outer frame 12 for supporting both upper and lower oven cavities 6 and 10.

In a manner known in the art, a door assembly 14 is provided to selectively provide access to upper oven cavity 6. As shown, door assembly 14 includes a handle 15 at an upper portion 16 thereof. Door assembly 14 is adapted to pivot at a lower portion 18 to enable selective access to within oven cavity 6. In a manner also known in the art, door 14 is provided with a transparent zone or window 22 for viewing the contents of oven cavity 6 while door 14 is closed. A corresponding door assembly 24 including a handle 25 and a transparent zone or window 26 is provided to selectively access lower oven cavity 10.

As best seen in FIG. 1, oven cavity 6 is defined by a bottom wall 27, an upper wall 28, opposing side walls 30 and 31 provided with a plurality of vertically spaced side rails 32, and a rear wall 33. In the preferred embodiment shown, bottom wall 27 is constituted by a flat, smooth surface designed to improve the cleanability of oven cavity 6. Arranged about bottom wall 27 of oven cavity 6 is a bake element 40. Also, a top broiler element 42 is arranged along upper wall 28 of oven cavity 6. Top broiler element 42 is provided to enable a consumer to perform a grilling process in upper oven 4 and to aid in pyrolytic heating during a self-clean operation. As shown, both bake element 40 and top broiler element 42 are constituted by sheathed electric resistive heating elements.

Based on the above, cooking appliance 2 actually constitutes an electric, dual wall oven. However, it is to be understood that cooking appliance 2 could equally operate on gas, either natural or propane. In addition, cooking appliance 2 may be a single wall oven or a combination of a wall oven and a microwave oven. In the preferred embodiment shown in FIG. 1, oven cavity 6 employs both radiant and convection heating techniques for cooking food items therein. To this end, rear wall 33 is shown to include a convection fan or blower 44. Although the exact position and construction of fan 44 can readily vary, as shown, fan 44 draws in air at a central intake zone (not separately labeled) and directs the air into oven cavity 6 in a radial outward direction. Although not depicted in this figure, another sheathed electric heating element is provided behind cover 46, which preferably takes the general form of a ring, with this heating element extending circumferentially about fan 44 in order to heat the radially expelled air flow.

In addition to the heating elements described above, the oven 10 also includes a steam system (identified below) exposed to oven 4 in order to introduce steam into the cavity 6. The steam system may include a boiler that heats water stored in the steam system. However, the steam system can be any suitable system that is capable of introducing steam directly into cavity 6 or introducing water that is turned into steam in the cavity 6 and is not limited to any particular steam system.

As further shown in FIG. 1, cooking appliance 2 includes an upper control panel 50 having a plurality of control elements. In accordance with one embodiment, the control elements are constituted by first and second sets of oven control buttons 52 and 53, as well as a numeric pad 54. Control panel 50 is adapted to be used to input desired cooking parameters and input initial operating conditions for cooking appliance 2. More specifically, the first and second sets of control buttons 52 and 53, in combination with numeric pad 54 and a display 62, enable a user to establish particular cooking operations for upper and lower ovens 4 and 8 respectively.

Although a wide range of control configurations could be employed, in the embodiment shown in FIG. 1, first set of control buttons 52 includes a cancel button, a convection button, a bake button, a steam button, broil button, and a clean button. In addition, an oven light button 88 and a button 109 used to access more cooking options may also be provided. In a corresponding manner, second set of control buttons 53 may include a light button, a cancel button, a convection button, a bake button, a broil button, steam button and a clean button.

Since the general operational characteristics of cooking appliance 2 do not form part of the present invention, these features will not be discussed further here. Instead, the present invention is particularly directed to the operation of a rotisserie cooking mode to perform a desired cooking operation in cooking appliance 2. To this end, control panel 50 is also provided with a rotisserie cooking mode input, such as in the form of a button 180, used to control the operation of the rotisserie system of the invention as will now be described in detail.

A rotisserie arm 150, or spit, is provided within cooking appliance 2 and is operatively coupled to a rotisserie motor 160 for rotating rotisserie arm 150. Rotisserie arm 150 may be a removable attachment that fits within oven cavity 6 and coupled directly to oven walls 30 and 31. However, in the embodiment shown in FIG. 1, rotisserie arm 150 is supported by a support frame 162 and is coupled to rotisserie motor 160 at a first end 165. One end 167 of rotisserie arm 150 is provided with a sharp piercing point (not shown) for passing through food products. That is, a food product, such as a chicken, turkey or other food item to be cooked in the rotisserie cooking mode, is supported on support frame 162 through rotisserie arm 150, such as outside of oven cavity 6, and then first end 165 is drivingly engaged with an output shaft (not shown) of motor 160. In this manner, rotisserie arm 150 supports food products for rotational movement within oven cavity 6.

Figure 2:
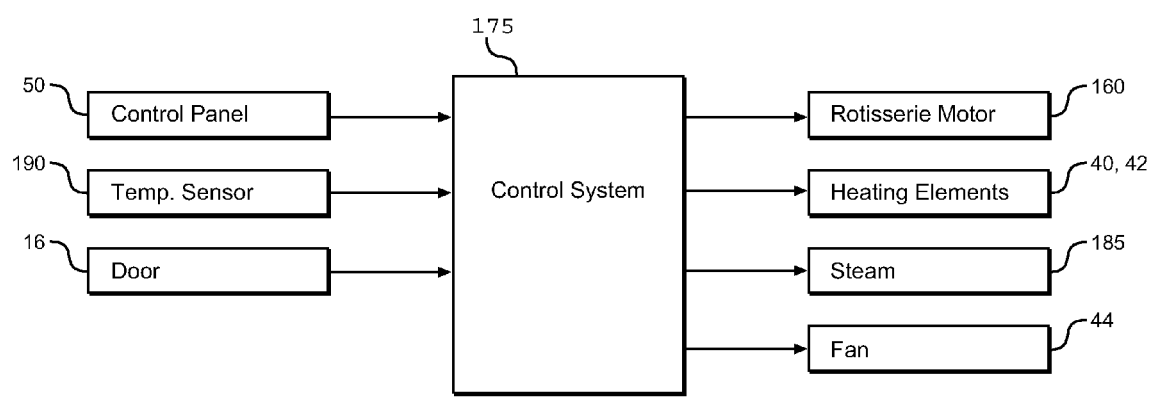
FIG. 2 is a block diagram illustrating a control system for the rotisserie arrangement of the invention.

After a user mounts a food product on rotisserie arm 150 and selects a rotisserie cooking mode by depressing the rotisserie cooking mode input button 180 from control panel 50, a control system 175 causes a rotisserie motor relay to close, thereby activating rotisserie motor 160. Upon the selection of the rotisserie cooking mode, control system 175 also causes a heating element relay switch to close, thereby activating heating elements 40 and 42. More specifically, as illustrated in FIG. 2, control system 175 controls the operation of rotisserie motor 160, heating elements 40 and 42, a steam system 185 and the convection system including fan 44. Basically, control system 175 receives signals from control panel 50, a temperature sensor 190 used to sense an operating temperature within oven cavity 6, and a switch coupled to door 14 in order to regulate the operation of cooking appliance 2. In connection with the invention, during a rotisserie cooking operation, control system 175 is able to cause rotisserie motor 160 to continuously operate, pulse or cycle, or stop as detailed below.

When door 14 is closed during the rotisserie cooking operation, rotisserie motor 160 is designed to normally rotate at a pre-established rotational speed. However, the speed of rotisserie motor 160 may also be controlled based on user inputs, timing sequences or sensed temperature values in order to maximize the cooking performance. More specifically, control system 175 can function to control rotisserie motor 160 to continuously rotate at a fixed speed, while cycling heating elements 40 and 42, with or without fan 44 of the convection system, at present intervals, for the duration of the cooking operation. That is, so long as door 14 is closed. Alternatively, control system 175 can be configured to cycle both rotisserie motor 160 and heating elements 40 and 42 at preset intervals while door 14 is closed. In another variation, timing circuits within control system 175 can be user programmable through a plurality of methods, including switch settings and keypad entry on control panel 50. For instance, it may be desired to perform a browning stage at a terminal phase of the overall cooking operation such that heating elements 40 and/or 42 are activated while rotisserie motor 160 is stopped to allow food product to be browned or seared. Therefore, it should be readily recognized that various interrelated control configurations are available for the cooking mode while door 14 is closed, including continuously activating rotisserie motor 160 while cycling heating elements 40 and 42, simultaneously cycling both rotisserie motor 160 and the various heating sources, and activating heating element(s) 40 and/or 42 while rotisserie motor 160 is stopped for browning purposes.

In addition to the above control variations, cooking appliance 2 preferably includes temperature sensor 190 for detecting the air temperature within oven cavity 6. Temperature sensor 170, which may be a resistance temperature detector (RTD), signals the temperature in oven cavity 6 to control system 175. As with the operation of a conventional oven, control system 175 uses the temperature signals to regulate the activation status of the various heating sources, with this regulation being used to solely control the activation state of the various heating sources as in a conventional oven or to also control the activation state of rotisserie motor 160 based on the particular control sequence employed as discussed above.

As indicated above, the invention contemplates a specified control for at least rotisserie motor 160 when door 14 is opened. More particularly, in accordance with the present invention, if a user opens door 14, control system 175 will automatically cause rotisserie motor to cycle on and off, while also preferably disabling heating elements 40 and 42. In a preferred form of the invention, rotisserie arm 150 is automatically pulsed to rotate 360 degrees whenever door 14 assumes an open position. In this manner, portions of the food product on rotisserie arm 150 will be successively exposed to the user such that the user can easily baste the entire food product. For example, rotisserie arm 150 and food product may rotate 90 degrees with each pulse or cycle of rotisserie motor 160 so that the user may baste quarter portions of the food product. In one advantageous embodiment, rotisserie motor 160 is slowly cycled on and off to allow for an intermittent 360 degree food product rotation in 20 to 30 seconds.

Although described with reference to preferred embodiments of the invention, it should be readily understood that various changes and/or modifications can be made to the invention without departing from the spirit thereof. For instance, the method of operating a rotisserie oven may be used in a single cavity oven. Further, the overall rotisserie operational cycle may automatically incorporate a steam heat function that may be activated during a portion of an overall rotisserie cooking operation. In general, the invention is only intended to be limited by the scope of the following claims.

We claim:

1. A method for operating an oven having an oven cavity, at least one heating element for heating the oven cavity, a door movable between open and closed positions for selectively accessing the oven cavity, a rotisserie arm adapted to support a food product in the oven cavity, a motor operatively connected to rotate the rotisserie arm and a control unit, the method comprising:

upon selecting a rotisserie cooking mode of operation for the oven, activating the motor to rotate the rotisserie arm supporting a food product in the oven cavity, while operating the heating element to heat the oven cavity, with the door in the closed position;

establishing a cooking phase when the door is shifted to the closed position;

in response to the door being shifted to the open position, the control unit automatically cycles the motor on and off to cause intermittent rotation of the food product supported on the rotisserie arm while the door is open; and altering operation of the rotisserie arm supporting the food product, from when the door is in the open position, during the cooking phase, wherein the heating element is activated when the motor is stopped during a portion of the cooking phase.

2. The method of claim 1, wherein cycling the motor on and off provides for an intermittent 360 degree rotation of the food product supported on the rotisserie arm.

3. The method of claim 2, wherein the intermittent 360 degree rotation of the food product occurs in 20-30 seconds.

4. The method of claim 1, further comprising: controlling rotation of the rotisserie arm based on a preset timing sequence.

5. The method of claim 1, wherein said heating element and said motor are cycled simultaneously during the cooking phase with the door in the closed position.

6. The method of claim 1, further comprising:
sensing a temperature within the oven cavity during the cooking phase; and
controlling rotation of the rotisserie arm based on the sensed temperature.

7. The method of claim 1, wherein the rotisserie arm is continuously rotated during the cooking phase with the door in the closed position.

8. A method for operating an oven, including an oven cavity, at least one heating element for heating the oven cavity, a door movable between open and closed positions for selectively accessing the oven cavity, a rotisserie arm adapted to support a food product in the oven cavity, a motor operatively connected to rotate the rotisserie arm and a control unit, in a rotisserie cooking mode of operation, the method comprising:

establishing a cooking phase when the door is shifted to the closed position;

when the door is in the closed position, activating, through the control unit, both the motor to rotate the rotisserie arm supporting a food product in the oven cavity and the heating element to heat the oven cavity;

when the door is in the open position, automatically cycling, through the control unit, the motor on and off to cause intermittent rotation of the food product supported on the rotisserie arm; and altering operation of the rotisserie arm supporting the food product, from when the door is in the open position, during the cooking phase, wherein the heating element is activated when the motor is stopped during a portion of the cooking phase.

9. The method of claim 8, further comprising: when the door is in the open position, deactivating, through the control unit, the heating element.

* * * * *